United States Patent [19]

Magee et al.

[11] Patent Number: 4,661,936
[45] Date of Patent: Apr. 28, 1987

[54] APPARATUS FOR AND METHOD OF DOPPLER MOTION DETECTION WITH STANDING WAVE DRIFT COMPENSATION

[75] Inventors: Mark R. Magee, Saratoga, Calif.; Richard E. Saffran, Boston, Mass.

[73] Assignee: GTE Government Systems Corporation, Stamford, Conn.

[21] Appl. No.: 675,033

[22] Filed: Nov. 26, 1984

[51] Int. Cl.⁴ .............................................. G08B 13/16
[52] U.S. Cl. ..................................... 367/94; 340/553; 340/554; 367/93
[58] Field of Search ..................... 367/94, 93; 340/553, 340/554

[56] References Cited

U.S. PATENT DOCUMENTS

| | | | |
|---|---|---|---|
| 3,407,403 | 10/1968 | Charlot, Jr. | 340/554 |
| 4,142,187 | 2/1979 | Nakayama | 367/94 |
| 4,198,618 | 4/1980 | Kleinschmidt | 367/94 |
| 4,580,249 | 4/1986 | Magee et al. | 367/94 |

*Primary Examiner*—Glen R. Swann, III
*Attorney, Agent, or Firm*—Douglas M. Gilbert; John F. Lawler

[57] ABSTRACT

Drift of the standing wave pattern in an acoustic doppler intrusion detection system in a confined space is compensated by adjusting the relative radiating and receiving positions of the radiator and receiver transducers, respectively, either mechanically or electrically until the signal level of the carrier wave at the receiver transducer is optimized. In the mechanical adjustment mode, either the receiver transducer or the radiating transducer is supported for movement relative to the other and is moved by a motor energized under the control of a signal level sensor circuit connected to the output of the receiver transducer. In another mode, a plurality of receiver (or alternatively radiator) transducers are connected through a switch to the signal level sensor circuit which in response to a drop in received signal level below a predetermined threshold, selectively switches the active transducer to optimize the received signal level. In still another mode, one of at least two radiator (or alternatively, receiver) transducers is connected through a variable phase shifter to the signal generator (or to the receiver circuit for the receiver transducer), the phase shifter being adjustable in response to the output of the signal level sensor to optimize the signal level at the receiver transducer. The invention comprehends the apparatus for and method of optimizing signal strength at the receiver transducer.

13 Claims, 9 Drawing Figures

APPARATUS FOR AND METHOD OF DOPPLER MOTION DETECTION WITH STANDING WAVE DRIFT COMPENSATION

BACKGROUND OF THE INVENTION

This invention was made under a contract with the Defense Nuclear Agency.

This invention relates to intrusion detection systems and more particularly to an acoustic doppler motion detection system used to detect moving objects in a confined space.

Acoustic doppler motion detection systems are used in enclosed volumes such as rooms and the like and operate by transmitting or radiating a signal and monitoring the return signal for changes caused by motion of an object within the room. many of the such rooms are reverberant and as such, under steady state conditions, produce a fixed standing wave pattern with nulls and peaks throughout the room. Because this standing wave pattern exists in the room, the level or magnitude of the signal at the receiving transducer depends on the location of the latter relative to the pattern. If the location of contents of the protected space, such as crates in a warehouse or furniture in an office, remains unchanged indefinitely and the temperature does not change, the standing wave pattern is essentially stationary and the level of the received signal is substantially constant. However, if the contents are moved within the space or if the air temperature changes, the standing wave pattern changes so that the receiving transducer mayb e located at a null resulting in poor signal strength and degradation of system performance.

One technique that has been proposed to overcome this problem is the use of a distributed microphone such as an elongated electret cable or tape which is sensitive throughout its length. The rationale for this approach was that differences in signal strength due to the standing wave pattern would average out over the length of the microphone. In practice, however, this was not the case and the technique provied to be unsuccessful.

This invention is directed toward a solution of this problem.

OBJECTS AND SUMMARY OF THE INVENTION

A general object of the invention is the provision of an acoustic doppler detection system in which standing wave drift is effectively compensated.

A further object is the provision of such a system in which standing wave drift compensation is accomplished automatically.

Still another object is the provision of such a system in whcih standing wave drift compensation is achieved with standard components that are easily installed without special tools or skills.

Another object is the provision of a method of automatically compensating standing wave drift in an acoustic doppler motion detection system.

These and other objects of the invention are achieved with apparatus for and a method of changing the relative radiating and receiving positions of the radiator and receiver transducers, respectively, in response to a decrease in received signal strength below a predetermined threshold.

DESCRITION OF PREFERRED EMBODIMENTS

Figure 1:
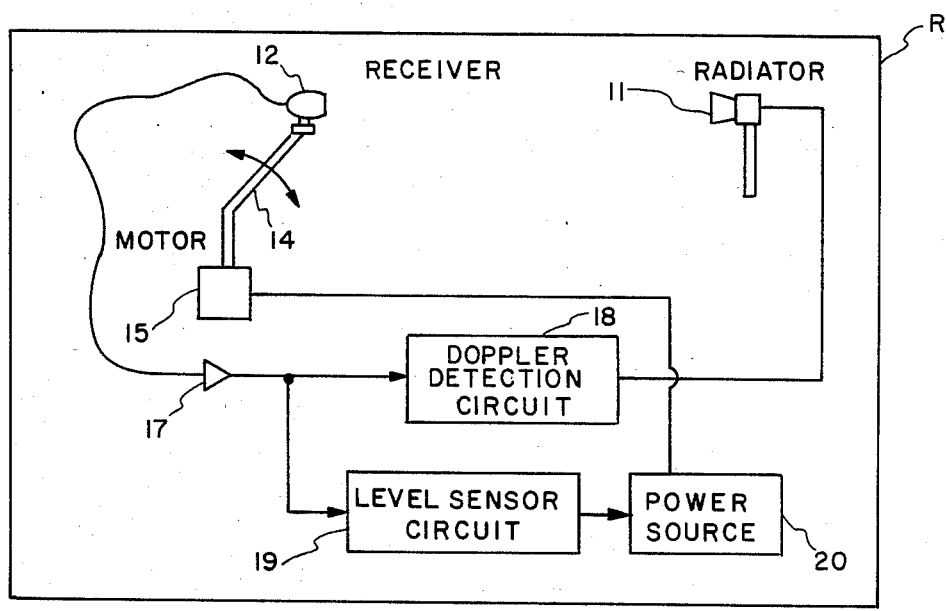
FIG. 1 is a schematic and block diagram of acoustic doppler detection appratus embodying the invention with a physically movable receiver transducer driven by a motor upon a predetermined detected decrease in received signal strength.

Referring now to the drawings, FIG. 1 illustrates one embodiment of the invention in a confined space such as a room R. This embodiment comprises a doppler detector apparatus 18, with a radiating transducer 11 and a receiving transducer 12 spaced apart in room R as shown. In one embodiment radiating transducer 11 is a loud speaker and radiates an acoustic carrier wave at, for example, 2 kHz into the entire room. The carrier wave is reflected from the room walls and from objects within the room and, because the room is reverberant, a standing wave pattern with peaks and nulls is set up through the room. Receiving transducer 12 is mounted on an arm 14 supported for rotation on and by motor 15 as indicated by the arrows. Radiating transducer 11 is supported in a fixed or stationary position.

Figure 2:
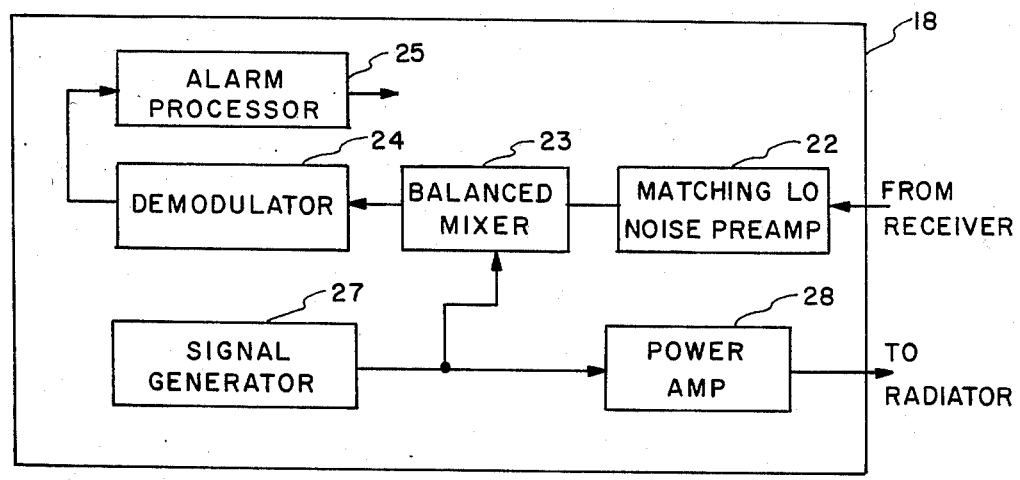
FIG. 2 is a block diagram of a doppler detection circuit forming part of the apparatus shown in FIG. 1 and FIG. 1A.

Receiving transducer 12 is electrically connected through a bandpass filter 17 to a doppler detection circuit 18, see FIG. 2, which is also connected to radiating transducer 11. Transducer 12 is also connected to a level sensor circuit 19, see FIG. 3, the output of which is connected to power source 20 which energizes motor 15.

Referring to FIG. 2 Doppler detection circuit 18 comprises a preamplifier 22 connected to the output of bandpass filter 17, a mixer 23, a demodulator circuit 24 and an alarm processor 25 connected in series with receiving transducer 12. The output of alarm processor 25 energizes an alarm device such as a bell or visual display. Circuit 18 also includes a signal generator 27 connected through a power amplifier 28 to radiating transducer 11. Mixer 23 is also connected to the output of signal generator 27. Mixer 23 is also connected to the output of signal generator 27. In operation, transducer 11 radiates into room R an acoustic carrier wave at the operating frequency of generator 27. Transducer 12 receives the wave which is demodulated in detection circuit 18. If an object such as an intruder moves within or into the room, that movement modulates the frequency and amplitude of the carrier wave resulting in an output from demodulator 24 that causes alarm processor 25 to produce an alarm. Basically the doppler detector 18 looks for a change inf requency to trigger an alarm output. This circuit is known in the prior art and does not per se constitute part of this invention.

Figure 3:
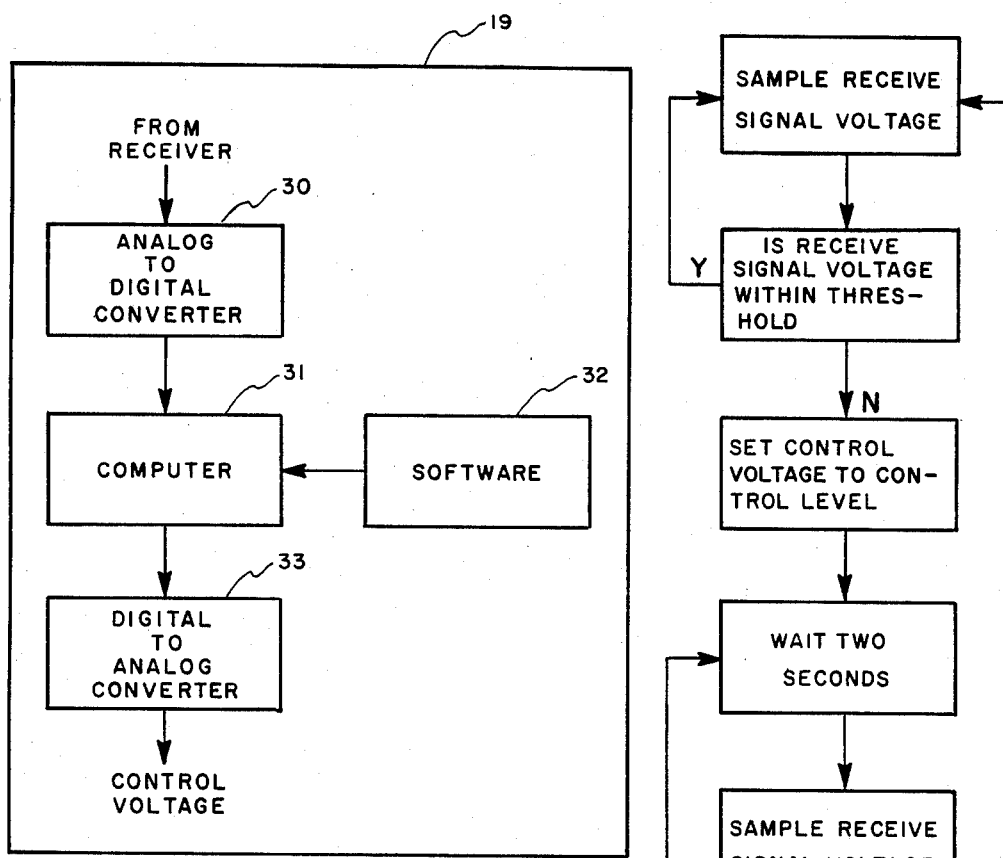
FIG. 3 is block diagram of a level sensor circuit forming part of the apparatus shown in FIG. 1 and FIG. 1A.
Figure 4:
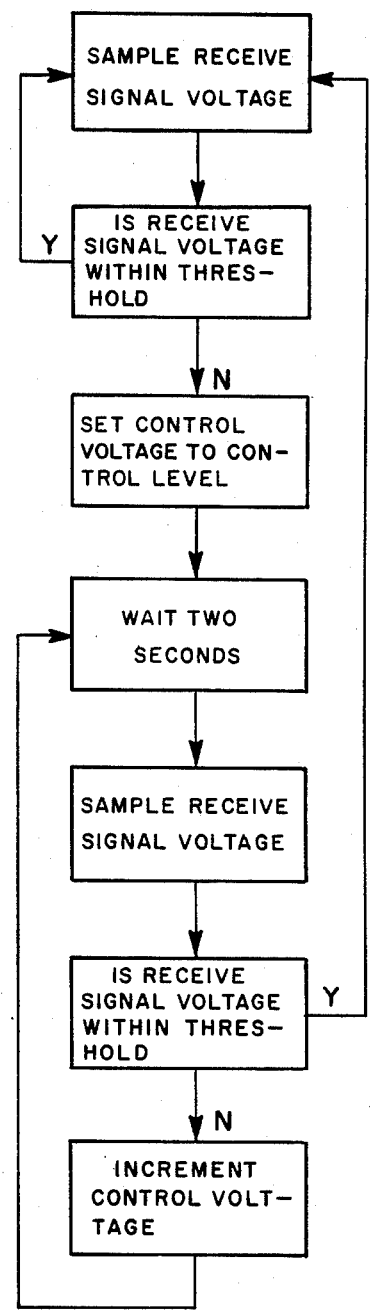
FIG. 4 is a block representation of an algorithm for operating the computer in the circuit FIG. 3.

Level sensor circuit 19 is designed to continually monitor the level of the received signal and to generate a control signal that causes power source 20 to activate motor 15. Referring to FIG. 3, circuit 19 comprises an analog-to-digital converter 30, a digital computer 31 operated with software 32, and a digitalto-analog converter 33. Converter 30 receives its input from receiving transducer 12 through filter 17 and applies its digital output to computer 31. The computer determines whether the magnitude of the received signal is above or below a predetermined threshold and causes power source 20 to incrementally energize motor 15 which moves the position of transducer 12 until the received signal level reaches the desired threshold. The motor then stops. This adjustment is repeated whenever the magnitude of the received signal falls below a preset threshold. Computer 31 is operated under the control of software 32 based on an algorithm represented in FIG. 4.

Figure 1A:
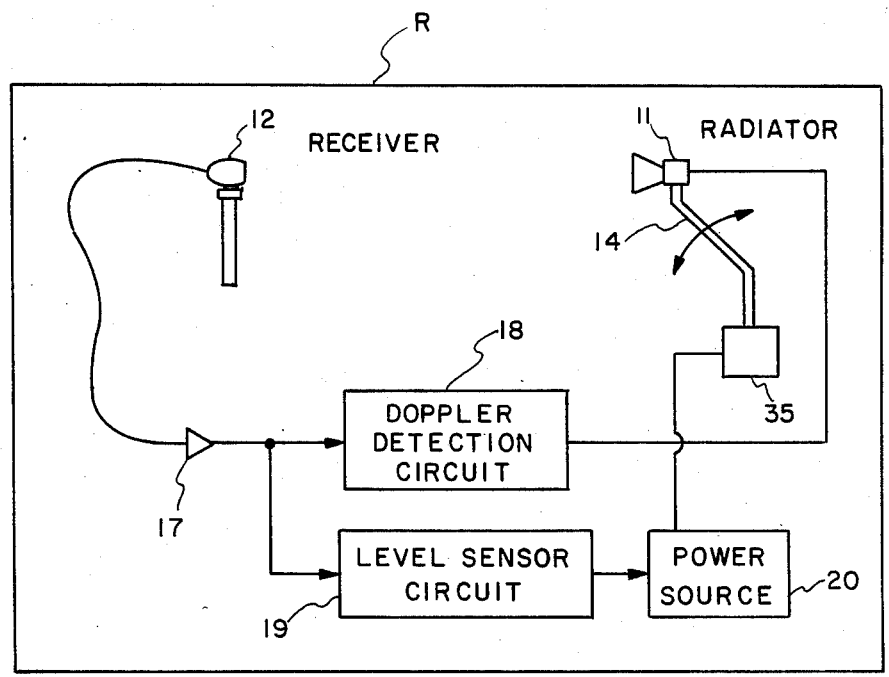
FIG. 1A is a diagram of an alternative embodiment of the inventive structure depicted in FIG. 1 having a physically movable radiator.

Referring to FIG. 1A, the relative positions of transducers 11 and 12 may also be changed to enhance the received signal level by holding the receiving transducer stationary and causing power source 20 to energize motor 35 (instead of motor 15 in FIG. 1) and thereby moving radiating transducer 11. In other respects, the apparatus functions essentially as described above.

Figure 5:
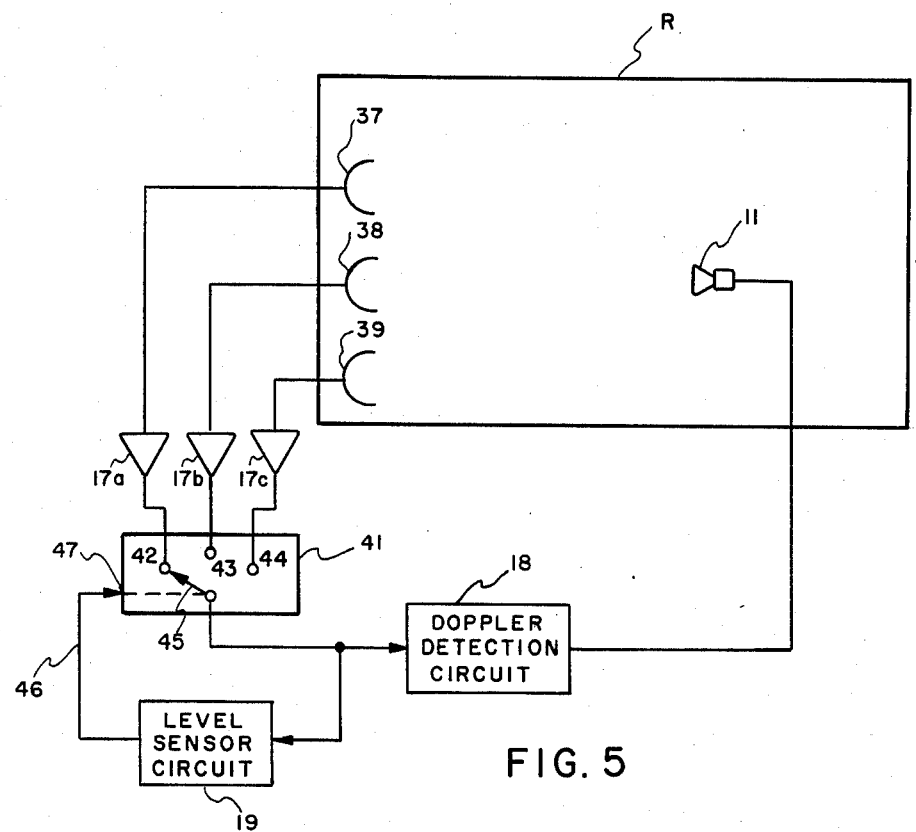
FIG. 5 is a diagram of another embodiment of the invention having multiple receiving transducers.

Another embodiment of the invention is shown in FIG. 5 and comprises a plurality (three as shown) of receiving transducers 37, 38 and 39 in room R spaced from each other and from radiating transducer 11; in the description of this and subsequent embodiments, like reference characters indicate like components in the drawings. Transducers 37, 38 and 39 are connected, through bandpass filters 17a, 17b and 17c respectively, and a selector switch 41, to doppler detection circuit 18 and to level sensor circuit 19. Selector switch 41 has fixed contacts 42, 43 and 44 and a wiper contact 45. The position of the wiper contact 45 is controlled by the output of level sensor circuit 19 as indicated by solid line 46 and broken line 47. In practice switch 41 may be and preferably is an analog switch device (Quad SPST-JFET) part number LF 11202 made by National Semiconductor Corporation in Santa Clara, Calif.

In operation level sensor circuit 19 determines whether the magnitude of the received signal at the operative receiving transducer is above the predetermined threshold; if it is not, the output of circuit 19 causes contact 45 to shift to the adjacent fixed contact for a repeat comparison of signal strength at the corresponding transducer with the threshold. Switch 41 thus selects the receiving transducer which produces a signal within the desired threshold and compensates for a drop in signal strength due to a shift in the standing wave pattern in room R. It is understood that the three receiving transducers are shown and described merely by way of example and that as many such transducers may be used with the appropriate switch as is required to obtain the desired results.

Figure 6:
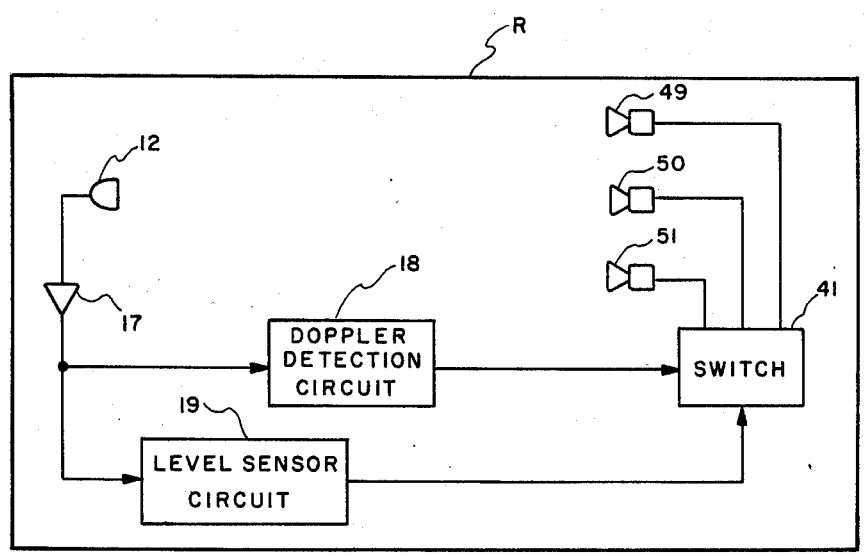
FIG. 6 is a block diagram of yet another embodiment of the invention having multiple radiating transducers.

The embodiment shown in FIG. 6 is similar to that of FIG. 5 except that a plurality (three as shown) of spaced radiating transducers 49, 50 and 51 are used with one receiving transducer 12, the former being connected through selector switch 41 to the signal generator in detection circuit 18. Level sensor circuit 19 controls switch 41 in selecting the radiating transducer which produces at receiving transducer 12 a signal that is within threshold in the same manner as described above in FIG. 5.

Figure 7:
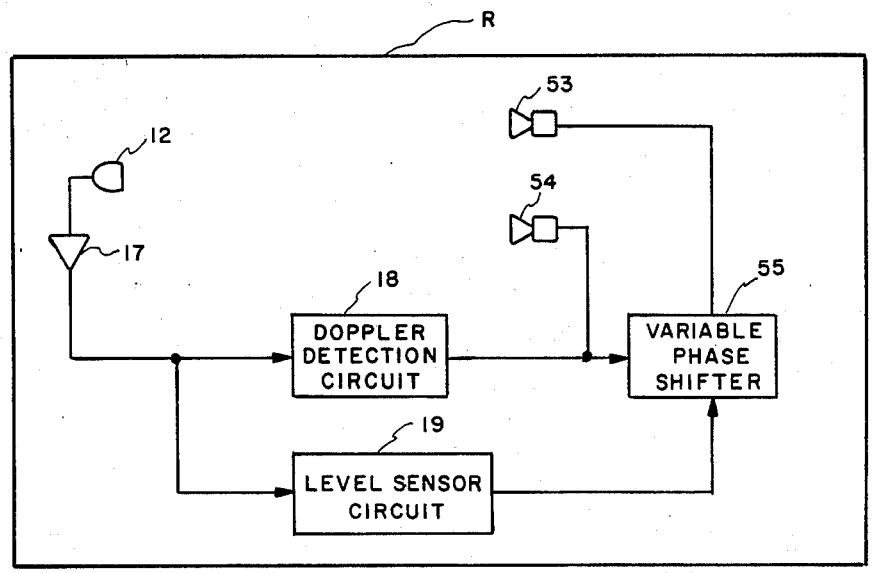
FIG. 7 is a block diagram of another embodiment with a pair of radiating transducers and a variable phase shifter in the feed line of one of the transducers.

Another embodiment of the invention shown in FIG. 7 comprises a pair of spaced radiating transducers 53 and 54 and a single receiving transducer 12, the latter being connected to detection circuit 18 and to level sensor circuit 19 essentially as shown in FIG. 1. Radiating transducer 54 is connected to the signal generator of detection circuit 18 as in FIG. 1 but the other radiating transducer 53 is connected to detection circuit 18 through a variable phase shifter 55 such as a variable inductance coil. Phase shifter 55 is operatively connected to the output of level sensor circuit 19 as shown, the latter determining the amount of delay in or phase shift of the signal fed to transducer 53 in response to the magnitude of the received signal at receiving transducer 12 and, in effect, changing (electrically) the radiating position of transducer 53 relative to transducers 54 and 12. The standing wave pattern of acoustic waves propagated into room R by both radiating transducers 53 and 54 is thus altered to compensate for drift detected by level sensor circuit 19.

Figure 8:
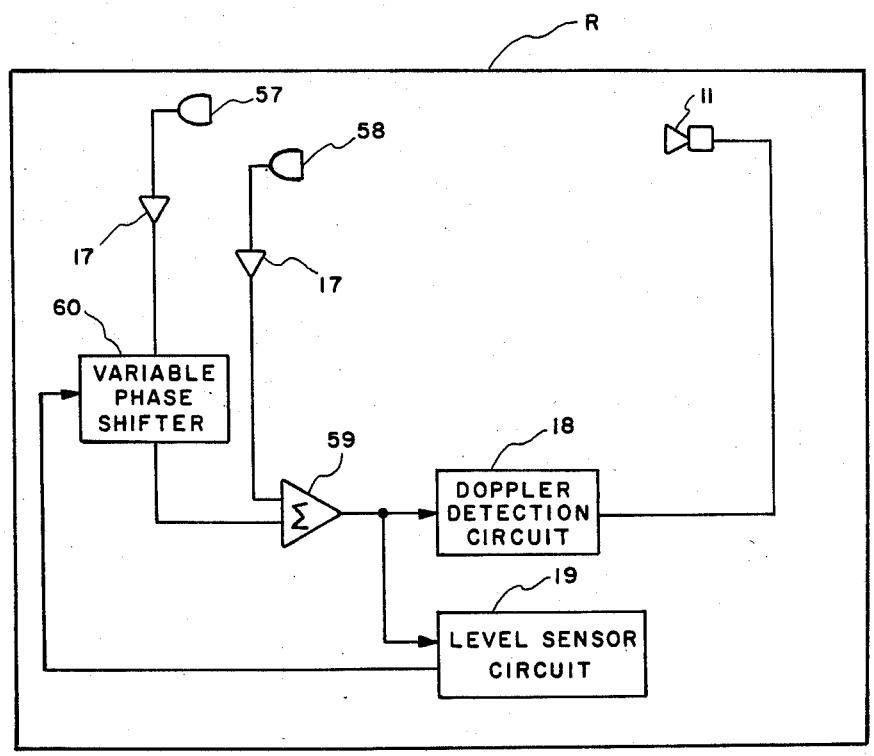
FIG. 8 is a block diagram of still another embodiment with a pair of receiving transducers and a variable phase shifter in the feed line of one of the transducers.

The embodiment shown in FIG. 8 is a variation of that shown in FIG. 7 wherein the outputs of two receiving transducers 57 and 58 are added in a summing circuit 59 and transducer 57 is connected to circuit 59 through a variable phase shifter 60. The output of summing circuit 59 is passed to detection circuit 18 and to level sensor circuit 19, the latter being operatively connected to phase shifter 60 as before and producing a control voltage which adjusts the signal delay by phase shiafter 60 sufficiently to electrically change the relative receiving positions of transducers 57 and 58 and thus compensate for standing wave pattern shifts.

What is claimed is:

1. Apparatus for detecting motion of an object in a confined space to the degree that said object amplitude modulates a carrier wave in a predetermined frequency range, said apparatus comprising:
   means for generating the carrier wave;
   radiator means connected to said generating means and positioned to radiate the carrier wave into said space;
   receiving means spaced from said radiator means and positioned in said space to receive said carrier wave;
   demodulator means connected to the output of said receiver means for demodulating said carrier wave and for producing an alarm in response to movement of an object in said space; and
   means to change the effective position of said radiator means or said receiver means, in response to a decrease in the strength of the carrier wave at said receiver means below a predetermined level.

2. Apparatus according to claim 1 in which said receiver means comprises a receiving transducer, said last named means comprising means to support said transducer for movement in said space relative to said radiator means, a motor operatively connected to said support means for moving said transducer, and circuit means connected to said motor and responsive to the signal level of the received carrier wave whereby to energize the motor when the signal level is less than a predetermined value.

3. Apparatus according to claim 1 in which said radiator means comprises a radiating transducer, said last named means comprising means to support said radiating transducer for movement in said space relative to said receiver means, a motor operatively connected to said support means for moving said radiating transducer, and circuit means connected to said motor and responsive to the signal level of the received carrier wave whereby to energize the motor when the signal level is less than a predetermined value.

4. Apparatus according to claim 1 in which said receiver means comprises a plurality of receiving transducers, said last named means comprising a switch having input contacts connected to the outputs, respectively, of said transducers and having an output contact connected to said demodulator means and being operative to selectively connect one of said input contacts to said output contact, a level sensor circuit having an input conneced to said output contact and having an output connected to said switch, said circuit being operative to sense the amplitude of signals from said transducers,.

5. Apparatus according to claim 1 in which said radiating means comprises a plurality of radiating transducers, a switch having output contacts connected to the inputs, respectively of said radiating transducers and having an input contact connected to said generating means and being operative to selectively connect one of said output contacts to said input contact, a level sensor circuit having an input connected to the output of said receiver means and having an output connected to said switch, said circuit being operative to sense the amplitude of signals from said receiving means and to actuate said switch to connect to said demodulator means the radiating transducer producing the signal having an amplitude above a selected threshold.

6. Apparatus according to claim 1 in which said receiver means comprises at least two receiving transducers having respective outputs, said last named means comprising variable phase shift circuit connected to the output of one of said receiving transducers and having an output, a summing circuit having inputs connected to the outputs, respectively, of the other of said receiving transducers and of said phase shift circuit and having an output connected to said demodulator means, and a level sensor circuit having an input connected to the output of said summing circuit and having an output connected to said phase shift circuit whereby to adjust the phase difference between said receiving transducers to compensate for standing wave drift in said space.

7. Apparatus according to claim 1 in which said radiator means comprises at least two radiating transducers having respective inputs, said last named means comprising a variable phase shift circuit having an output connected to the input of one of said radiating transducers, said generating means having an output connected to the inputs, respectively, of the other of said radiating transducers and of said phase shift circuit, and a level sensor circuit having an input connected to the output said receiver means and an output connected to said phase shift circuit whereby to adjust the phase difference between said radiating transducers to compensate for standing wave drift in said space.

8. A method of detecting motion of an object in a confined space to the degree that said object amplitude modulates a carrier wave in a predetermined frequency range consisting of the steps of:
  generating said carrier wave;
  radiating said carrier wave into said space;
  receiving said carrier wave in said space;
  demodulating the received carrier wave and producing an alarm in response to movement of an object in said space; and
  changing the effective locations of radiation and reception of said carrier wave when the strength of the received wave falls below a predetermined level.

9. The method according to claim 8 in which the effective locations of radiation and reception are changed by physically moving the radiating and receiving locations relative to each other.

10. The method according to claim 8 employing a plurality of spaced transducers for receiving said carrier wave, and switching the point of reception of a carrier wave to the transducer at which the received wave strength is above said predetermined level.

11. The method according to claim 8 employing a plurality of spaced transducers for radiating said carrier wave, and switching the radiation of a received wave to the transducer that generates the carrier wave having a strength above said predetermined level.

12. The method according to claim 8 employing at least two spaced transducers for radiating said carrier wave, and shifting the phase of the carrier wave radiated by one of the transducers relative to the phase of the carrier wave radiated by the other until the strength of the received carrier wave is above said predetermined level.

13. The method according to claim 8 employing at least two spaced transducers for receiving said carrier wave, and, prior to the step of demodulating;
  summing the received carrier wave from each spaced transducer to produce a combined received carrier wave; and
  after the demodulating step, shifting the phase of the carrier wave received by one of the transducers relative to the phase of the carrier wave received by the other until the strength of the combined received carrier wave is above said predetermined level.

* * * * *